United States Patent
Pazmany

(10) Patent No.: US 11,148,535 B2
(45) Date of Patent: Oct. 19, 2021

(54) ELECTRIC VEHICLE

(71) Applicant: Dr. Ing. h.c. F. Porsche Aktiengesellschaft, Stuttgart (DE)

(72) Inventor: Jozsef Gabor Pazmany, Karlsruhe (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 15 days.

(21) Appl. No.: 16/871,152

(22) Filed: May 11, 2020

(65) Prior Publication Data

US 2020/0353824 A1  Nov. 12, 2020

(30) Foreign Application Priority Data

May 9, 2019  (DE) ...................... 10 2019 112 060.8

(51) Int. Cl.
*B60L 1/00* (2006.01)
*B60L 7/14* (2006.01)
(Continued)

(52) U.S. Cl.
CPC ............ *B60L 50/60* (2019.02); *H01M 50/50* (2021.01); *H02M 1/14* (2013.01); *H02P 27/08* (2013.01); *H01M 2220/20* (2013.01)

(58) Field of Classification Search
CPC ... H01M 2220/20; H01M 50/50; H02P 27/08; Y02E 60/10; B60L 2210/40; B60L 50/60;
(Continued)

(56) References Cited

U.S. PATENT DOCUMENTS 6,510,038 B1  1/2003 Satou et al.
9,340,114 B2 *  5/2016 Ferrel ..................... B60L 50/16
(Continued)

FOREIGN PATENT DOCUMENTS

DE  10 2010 028 238  5/2011
DE  10 2010 064 183  6/2012

OTHER PUBLICATIONS

Luo F. et al.—Design of a Hybrid Busbar Filter Combining a Transmission-Line Busbar Filter and a One-Turn Inductor for DC-Fed Three-Phase Motor Drive Systems—vol. 28, 2013—pp. 5588-5602.

*Primary Examiner* — Jared Fureman
*Assistant Examiner* — Esayas G Yeshaw
(74) *Attorney, Agent, or Firm* — Gerald E. Hespos; Michael J. Porco; Matthew T. Hespos

(57) ABSTRACT

An electric vehicle (10) has a traction battery (16), an electric traction motor (12) and a motor power electronics system (14) that feeds electrical energy to the traction motor (12) and is electrically connected to the traction battery (16). A coil-free, two-wire power ripple filter (20) having two line sections (22, 22') is arranged between the motor power electronics system (14) and the traction battery (16). Each two line section each is formed by a conductor core (28) and a conductor insulator (24). Each conductor insulator (24) has a thickness (D) of at least 1.0 mm and each is connected conductively to the vehicle ground (30) by way of an electrical ground connection (31, 32). The ohmic resistance of the ground connection (31, 32) between the conductor insulator (24) and the vehicle ground (30) is in each case at most 10 mOhms.

8 Claims, 2 Drawing Sheets

(51) Int. Cl.
*B60L 50/60* (2019.01)
*H02M 1/14* (2006.01)
*H02P 27/08* (2006.01)
*H01M 50/50* (2021.01)

(58) Field of Classification Search
CPC ... B60L 2270/147; H02J 1/02; H02J 2310/48; H02M 7/003; H02M 1/14; Y02T 10/72; Y02T 10/70
See application file for complete search history.

(56) References Cited

U.S. PATENT DOCUMENTS

| | | |
|---|---|---|
| 9,633,794 B2 | 4/2017 | Jun et al. |
| 10,666,045 B2* | 5/2020 | Gemin .................... B60L 50/40 |
| 2009/0052213 A1 | 2/2009 | Chen et al. |
| 2011/0094075 A1 | 4/2011 | Lee et al. |
| 2013/0106195 A1 | 5/2013 | Kusch et al. |
| 2017/0229937 A1* | 8/2017 | Pedersen ................. H01F 27/28 |

* cited by examiner

ELECTRIC VEHICLE

CROSS REFERENCE TO RELATED APPLICATION

This application claims priority under 35 USC 119 to German Patent Appl. No. 10 2019 112 060.8 filed on May 9, 2019, the entire disclosure of which is incorporated herein by reference.

BACKGROUND

Field of the Invention

The invention relates to an electric vehicle having a traction battery, an electric traction motor and a motor power electronics system that feeds electrical energy to the traction motor and is electrically connected to the traction battery.

Related Art

Typical electric vehicles are disclosed in U.S. Pat. No. 2,009,052 213 A1 and U.S. Pat. No. 2,013,106 195 A1. The electric vehicles each have a motor power electronics system that inevitably generates ripples in the frequency range of 10 Hz to 150 kHz, and these ripples may be disruptive both electrically and acoustically. Induction coils usually are used to smooth electric ripples and must be designed for electrically filtering the ripples of the motor power electronics system for electric currents of up to 250-400 A. As a result, such induction coils are large, heavy and relatively costly.

It is therefore an object of the invention to provide an electric vehicle having a simple power ripple filter.

SUMMARY

The electric vehicle according to the invention is provided with a traction battery and an electric traction motor that is fed electrically directly by a motor power electronics system that draws its electrical energy from the traction battery. The motor power electronics system undertakes, inter alia, the commutation, since the electric traction motor is generally of brushless design, and controls the electric power for example by pulse-width modulation. Owing to the commutation and the pulse-width modulation, the motor power electronics system generates low-frequency ripples in the range of 10 Hz to 150 kHz both on the input side and on the output side and emits the ripples into the entire electric motor vehicle system.

A coil-free power ripple filter therefore is arranged electrically between the motor power electronics system and the traction battery. The ripple filter is formed by two line sections each having an electrical conductor core and a conductor insulator that completely circumferentially surrounds the conductor core. The conductor insulator has a thickness of at least 1.0 mm. Each of the two conductor insulators of the two line sections is connected electrically conductively to the vehicle ground by an electrical ground connection. The ohmic resistance of the ground connections between the conductor insulator and the vehicle ground is, in each case, at most 10 milliohms.

The motor power electronics system of an electric vehicle operates at high voltages of more than 100 V. Thus, a skin effect is produced at electrical conductor cores and conductor insulators. This skin effect causes what is known as shielding damping. The shielding damping once again is improved significantly by a very low-ohmic electrical connection of the conductor insulator to the electrical vehicle ground. Tests have shown that in this way a power ripple filter can be implemented, by way of which the motor power electronics system can be shielded and damped effectively in the low-frequency range of 10 Hz to 150 kHz so that a damping coil can be omitted completely.

The two conductor cores can be designed for electric currents of several 100 A without problems and manage with a relatively short length for a sufficient filter effect. The length of the two conductor cores is preferably at most 10 cm to provide a compact and light power ripple filter that can be produced relatively inexpensively.

According to a preferred configuration, the conductor cores do not contain ferrite. Thus, magnetic coupling between the conductor core and the conductor insulator is virtually optimal.

The power ripple filter preferably does not have a metal housing. For example, a separate housing of the power ripple filter can be omitted completely.

The power ripple filter can be integrated into the electronics system of the electric vehicle, for example into the motor power electronics system. In a preferred configuration, the power ripple filter is a modular component part that can be assembled independently and that has electrical plugs that are plugged together with corresponding electrical plugs inside the electric vehicle upon assembly. Due to the modularity of the power ripple filter, a modular system of the electrical installation of the electric vehicle can be realized, as a result of which the diversity of variants of the electrical components is reduced. Furthermore, owing to the modularity of the power ripple filter, the exchangeability of a faulty power ripple filter is simplified.

An exemplary embodiment of the invention is explained in more detail in the following text with reference to the drawings.

DETAILED DESCRIPTION

Figure 1:
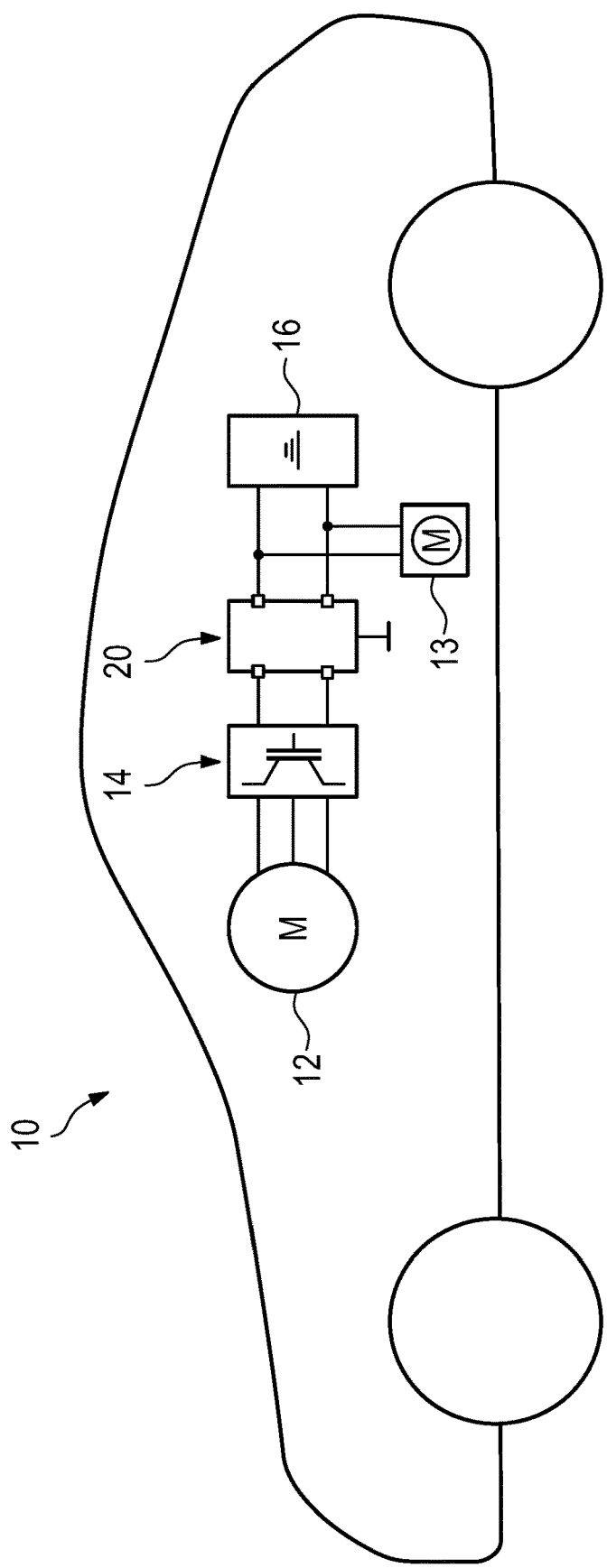
FIG. 1 schematically shows an electric vehicle having a traction battery, an electric traction motor, a motor power electronics system and a power ripple filter.

FIG. 1 schematically illustrates an electric vehicle 10 with an electric traction motor 12 that drives at least one wheel of the electric vehicle 10. The traction motor 12 is fed electrically by a motor power electronics system 14 that implements the commutation and sets the electric power for example by pulse-width modulation. The motor power electronics system 14 is supplied with electrical energy by a vehicle-based electric traction battery 16. The electric vehicle 10 has a further electric ancillary unit 13 that may be a further electric motor and also is supplied with electrical energy by the traction battery 16.

A power ripple filter 20 is arranged electrically between the traction battery 16 and the motor power electronics system 14. The power ripple filter is designed with two wires and without coils.

Figure 2:
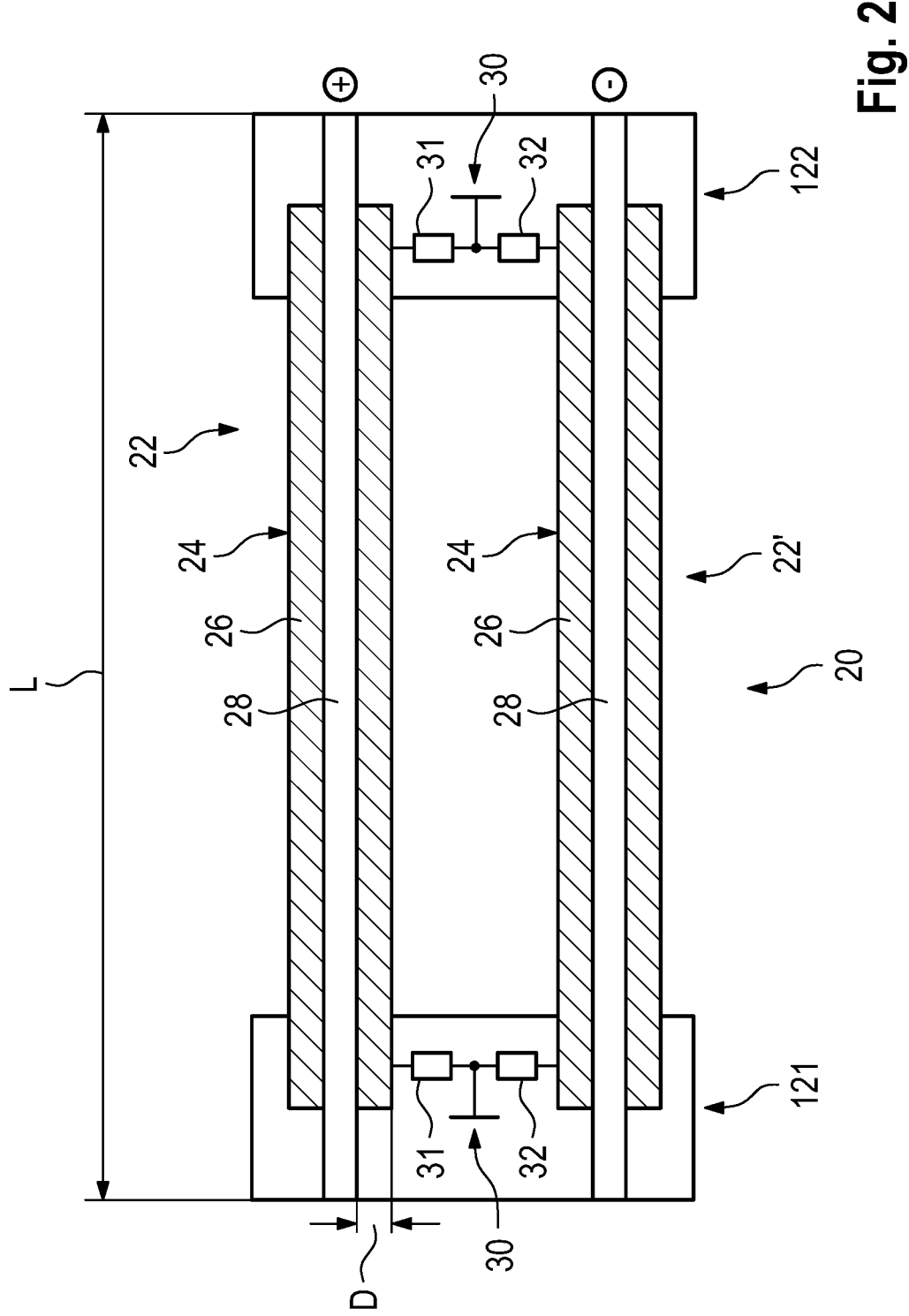
FIG. 2 is a detailed schematic illustration the power ripple filter of FIG. 1.

As schematically illustrated in FIG. 2, the power ripple filter 20 consists substantially of two line sections 22, 22', at the longitudinal ends of which a respective electrical plug 121, 122 is provided. The plugs 121, 122 enable the modular power ripple filter 20 to be connected electrically to the rest of the electrical components of the electric vehicle 10.

Each line section 22, 22' consists of a conductor core 28 made of a metal and electrically conductive conductor material. The cross-sectional area of the conductor core 28 is selected based on the specific ohmic resistance of the conductor material and the maximum currents to be transmitted. The conductor core 28 is of circular disk shape in cross section.

The conductor core 28 is insulated electrically by a conductor insulator 24 that has a wall thickness D of at least 1.0 mm. The conductor insulator 24 is formed by a sleeve-shaped or cylindrical insulator body 26 that is electrically insulating, and permits an electric skin effect in the outer layer thereof.

The two conductor insulators 24 are connected electrically to the electrical vehicle ground 30 by means of electrical ground connections 31, 32. The electrical resistance of the ground connections 31, 32 between the conductor insulator 24 and the vehicle ground 30 is at most 10 milliohms.

The overall length L of the two conductor cores 28 or of the two line sections 22, 22' is 10 cm.

What is claimed is:

1. An electric vehicle having a traction battery, an electric traction motor and a motor power electronics system, which feeds electrical energy to the traction motor and is electrically connected to the traction battery, characterized in that a coil-free, two-wire power ripple filter having two line sections is arranged between the motor power electronics system and the traction battery, said two line sections each being formed by a conductor core and a conductor insulator, and the conductor insulator has in each case a thickness of at least 1.0 mm and is in each case conductively connected to the vehicle ground by way of an electrical ground connection, wherein the ohmic resistance of the ground connection between the conductor insulator and the vehicle ground is in each case at most 10 mOhms.

2. The electric vehicle of claim 1, wherein the maximum length of the two conductor cores is at most 10 cm.

3. The electric vehicle of claim 2, wherein
neither of the two conductor cores contains ferrite.

4. The electric vehicle of claim 3, wherein the
power ripple filter does not have a metal housing.

5. The electric vehicle of claim 4, wherein the
power ripple filter in each case has electrical plugs that are connected electrically to corresponding plugs.

6. The electric vehicle of claim 1, wherein
neither of the two conductor cores contains ferrite.

7. The electric vehicle of claim 1, wherein the
power ripple filter does not have a metal housing.

8. The electric vehicle of claim 1, wherein the
power ripple filter in each case has electrical plugs that are connected electrically to corresponding plugs.

\* \* \* \* \*